(12) United States Patent
Li

(10) Patent No.: US 10,666,797 B2
(45) Date of Patent: May 26, 2020

(54) SYSTEM AND METHOD FOR VOICE PROMPT OF THIRD-PARTY CALL

(71) Applicants: Zhejiang Geely Holding Group Co., Ltd., Hangzhou, Zhejiang Province (CN); Zhejiang Geely Automobile Research Institute Co., Ltd., Taizhou, Zhejiang Province (CN)

(72) Inventor: Shufu Li, Hangzhou (CN)

(73) Assignees: ZHEJIANG GEELY HOLDING GROUP CO., LTD., Hangzhou, Zhejiang Province (CN); ZHEJIANG GEELY AUTOMOBILE RESEARCH INSTITUTE CO., LTD., Taizhou, Zhejiang Province (CN)

( * ) Notice: Subject to any disclaimer, the term of this patent is extended or adjusted under 35 U.S.C. 154(b) by 0 days.

(21) Appl. No.: 16/093,634

(22) PCT Filed: Jan. 13, 2017

(86) PCT No.: PCT/CN2017/071034
§ 371 (c)(1),
(2) Date: Oct. 13, 2018

(87) PCT Pub. No.: WO2017/190529
PCT Pub. Date: Nov. 9, 2017

(65) Prior Publication Data
US 2019/0132445 A1    May 2, 2019

(30) Foreign Application Priority Data

May 4, 2016 (CN) .......................... 2016 1 0292803

(51) Int. Cl.
*H04M 3/428* (2006.01)
*H04M 1/60* (2006.01)
(Continued)

(52) U.S. Cl.
CPC ......... *H04M 3/4288* (2013.01); *H04M 1/575* (2013.01); *H04M 1/578* (2013.01);
(Continued)

(58) Field of Classification Search
CPC ............. H04M 1/578; H04M 1/72569; H04M 3/4288; H04M 1/72519; H04M 1/6016;
(Continued)

(56) References Cited

U.S. PATENT DOCUMENTS 6,226,512 B1 * 5/2001 Macaulay et al. ............ 455/414
6,714,637 B1   3/2004 Kredo
(Continued)

FOREIGN PATENT DOCUMENTS

CN        1694471 A     11/2005
CN      101459713 A      6/2009
(Continued)

*Primary Examiner* — Meless N Zewdu
(74) *Attorney, Agent, or Firm* — Cheng-Ju Chiang

(57) ABSTRACT

The present disclosure provides a system and a method for voice prompt of a third-party call. The system includes a contact identification module, a hands-free control module and a voice broadcast module. The contact identification module is for identifying whether a third-party incoming call number exists in an address book of a communication device. The hands-free control module is for extracting a current call status when a third-party call dials in to help judge whether the current call is in hands-free mode. The voice broadcast module is for voice broadcasting information of the incoming call according to the identification result of the contact identification module when the current call is in hands-free mode. The present system could broadcast the information of the third-party incoming call without breaking off the current call so that prevents missing important content of the current call as well as an important incoming call.

15 Claims, 1 Drawing Sheet

(51) Int. Cl.
*H04M 1/725* (2006.01)
*H04M 1/57* (2006.01)
*H04W 68/00* (2009.01)

(52) U.S. Cl.
CPC ....... *H04M 1/6016* (2013.01); *H04M 1/6041* (2013.01); *H04M 1/6058* (2013.01); *H04M 1/6066* (2013.01); *H04M 1/72519* (2013.01); *H04M 1/72569* (2013.01); *H04W 68/00* (2013.01); *H04M 2250/60* (2013.01)

(58) Field of Classification Search
CPC .. H04M 1/6058; H04M 1/6066; H04M 1/575; H04M 3/428; H04M 1/57; H04M 1/725; H04M 1/6033; H04M 1/6041; H04M 1/605; H04M 1/6075; H04M 1/6091; H04M 1/72527; H04M 2250/60; H04M 1/72522; H04M 1/72597; H04M 1/27453; H04M 1/6063; H04M 1/56; H04M 2203/251; H04M 2203/252; H04M 2203/253; H04W 52/288; H04W 68/00; H04W 68/005

See application file for complete search history.

(56) References Cited

U.S. PATENT DOCUMENTS

| | | | |
|---|---|---|---|
| 8,942,674 B2* | 1/2015 | Kumar et al. | H04M 3/42212 |
| 9,172,792 B2* | 10/2015 | Lin | H04M 3/20 |
| 9,602,647 B2* | 3/2017 | Joergensen | H04M 1/6066 |
| 10,075,936 B1* | 9/2018 | Edara | H04W 68/005 |
| 2006/0183513 A1* | 8/2006 | Slamka et al. | 455/575.1 |
| 2007/0173287 A1* | 7/2007 | Henson et al. | 455/557 |
| 2008/0037720 A1* | 2/2008 | Thomson et al. | 379/88.01 |
| 2012/0021777 A1* | 1/2012 | Lazaridis et al. | 455/456.4 |
| 2012/0063577 A1* | 3/2012 | Foster | 379/93.17 |
| 2014/0195252 A1 | 7/2014 | Gruber et al. | |
| 2015/0133096 A1* | 5/2015 | Chatterjee et al. | H04M 3/42042 |
| 2015/0148011 A1 | 5/2015 | Chen | |
| 2015/0229770 A1* | 8/2015 | Shuman et al. | H04M 3/54 |
| 2016/0227386 A1* | 8/2016 | Shaltiel et al. | H04W 4/12 |

FOREIGN PATENT DOCUMENTS

| | | |
|---|---|---|
| CN | 101917506 A | 12/2010 |
| CN | 103139393 A | 6/2013 |
| CN | 103152478 A | 6/2013 |
| CN | 103905612 A | 7/2014 |
| CN | 104539789 A | 4/2015 |
| CN | 104618593 A | 5/2015 |
| CN | 104702762 A | 6/2015 |
| CN | 105245705 A | 1/2016 |
| CN | 105847580 A | 8/2016 |
| EP | 2381659 A1 | 10/2011 |
| JP | H10-126482 A | 5/1998 |
| JP | 2006-245919 A | 9/2006 |
| JP | 2008-22241 A | 1/2008 |
| JP | 2014-72701 A | 4/2014 |

* cited by examiner

SYSTEM AND METHOD FOR VOICE PROMPT OF THIRD-PARTY CALL

CROSS REFERENCE TO RELATED APPLICATION

The present application is a 35 U.S.C. § 371 National Phase conversion of International (PCT) Patent Application No. PCT/CN2017/071034, filed on Jan. 13, 2017, which is based on and claims priority of Chinese Patent Application No. 201610292803.8, filed on May 4, 2016. The entire disclosure of the above-identified application, including the specification, drawings and claims are incorporated herein by reference in its entirety. The PCT International Patent Application was filed and published in English.

FIELD OF THE INVENTION

The present disclosure relates to mobile communication technology, and more particularly to a system and a method for voice prompt of a third-party call.

BACKGROUND OF THE INVENTION

Nowadays, mobile phone has become an indispensable daily communication tool and plays an important role in social life. Mobile phone has a function that if a third party originates a call when a called terminal is in a call process, the phone will be provided by the network operator a tone of "didi", and the phone will display the incoming phone number on the call interface. If the incoming phone number corresponds to a contact already stored in the address book, the name of the contact will be displayed. According to the displayed information, the user can select to hold the existing call and answer the incoming call, or hang up the incoming call, or ignore the incoming call. However, there is a problem in this kind of operation. That is, if the user needs to determine how to cope with the incoming call, he or she needs to take the phone away from the ear, look at the screen and then make a decision, this will influence the current call and result the user missing important information in the current call. If the user does not look at the screen and ignore the incoming call, he or she may miss an important call. This may affect the work and life of the user, especially in the circumstance of missing an extremely important call.

SUMMARY OF THE INVENTION

For the abovementioned reasons, the present disclosure provides a system and a method for voice prompt of a third-party call, which makes the user could make a decision on a third-party incoming call without cutting off a current call.

The embodiments of the present disclosure provide a system for voice prompt of a third-party call being applied to a mobile terminal. The system includes a contact identification module, a hands-free control module and a voice broadcast module. The contact identification module is configured for identifying whether a third-party incoming call number exists in an address book of a communication device. The hands-free control module is configured for extracting a status of a current call when a third-party call dials in to help to judge whether the current call is in hands-free mode. The voice broadcast module is configured for voice broadcasting the information of the third-party incoming call according to an identification result of the contact identification module when the current call is in handset mode.

In an embodiment of the present disclosure, the voice broadcast module broadcasts the contact corresponding to the incoming call number when the incoming call number exists in the address book of the communication device, or broadcasts the incoming call number or broadcasts the incoming call as a stranger call when the incoming call number does not exist in the address book of the communication device.

In an embodiment of the present disclosure, the voice broadcast module further broadcasts the business name of the contact and/or the position of the contact when the incoming call number exists in the address book of the communication device.

In an embodiment of the present disclosure, the system further includes a call log statistics module, the call log statistics module is configured for recording the cumulative dialing number and/or the cumulative answering number of the incoming call, and the voice broadcast module further broadcasts the cumulative dialing number and/or the cumulative answering number of the incoming call when the incoming call number does not exist in the address book of the communication device.

In an embodiment of the present disclosure, the system further includes a display module, the display module is configured for displaying the contact corresponding to the incoming call number when the incoming call number exists in the address book of the communication device and the current call is in hands-free mode, or displaying the incoming call number or broadcasts the incoming call as a stranger call when the incoming call number does not exist in the address book of the communication device and the current call is in hands-free mode.

In an embodiment of the present disclosure, the display module further displays the business name of the contact and/or the position of the contact when the incoming call number exists in the address book of the communication device.

In an embodiment of the present disclosure, the system further includes a call log statistics module, the call log statistics module is configured for recording the cumulative dialing number and/or the cumulative answering number of the incoming call, and the display module further displays the cumulative dialing number and/or the cumulative answering number of the incoming call when the incoming call number does not exist in the address book of the communication device.

In an embodiment of the present disclosure, the system further includes a volume control module, the volume control module is configured for obtaining a volume of the current call and controlling a volume output of the voice broadcast module to make the volume broadcasted by the voice broadcast module less than the volume of the current call.

The present disclosure further provides a method for voice prompt of a third-party call. The method includes the steps of: identifying whether a third-party incoming call number exists in an address book of a communication device by a contact identification module; determining whether a current call is in hands-free mode by a hands-free control module; and broadcasting an information of the incoming call by a voice broadcast module and based on an identification result of the contact identification module when the current call is in handset mode.

In an embodiment of the present disclosure, in the step of broadcasting an information of the incoming call by a voice broadcast module and based on an identification result of the contact identification module when the current call is in handset mode, the voice broadcast module broadcasts the contact name of the incoming call when the incoming call number exists in the address book of the communication device, and broadcasts the incoming call number or broadcasts the incoming call as a stranger call when the incoming call number does not exist in the address book of the communication device.

In an embodiment of the present disclosure, when the incoming call number exists in the address book of the communication device, the method further includes the steps of: extracting the business name and/or the position of the contact from the address book of the communication device by the contact identification module; and broadcasting the business name and/or the position of the contact by the voice broadcast module.

In an embodiment of the present disclosure, the method further includes the steps of displaying the information of the incoming call by a display module and based on an identification result of the contact identification module when the current call is in hands-free mode.

In an embodiment of the present disclosure, in the step of displaying the information of the incoming call by a display module when the current call is in hands-free mode, the display module displays the contact name of the incoming call when the incoming call number exists in the address book of the communication device, and displays the incoming call number or displays the incoming call as a stranger call when the incoming call number does not exist in the address book of the communication device.

In an embodiment of the present disclosure, when the incoming call number exists in the address book of the communication device, the method further includes the steps of: extracting the business name and/or the position of the contact from the address book of the communication device by the contact identification module; and displaying the business name and/or the position of the contact by the display module.

In an embodiment of the present disclosure, the method further includes the steps of: recording a cumulative dialing number and/or a cumulative answering number of the incoming call by a call log statistics module; and broadcasting or displaying the cumulative dialing number and/or the cumulative answering number of the incoming call by the voice broadcast module or by a display module when the incoming call number does not exist in the address book of the communication device.

In an embodiment of the present disclosure, the method further includes the steps of: obtaining a volume of the current call by a volume control module; and controlling a volume output of the voice broadcast module by the volume control module, making the volume broadcasted by the voice broadcast module less than the volume of the current call.

The system and the method for voice prompt of a third-party call of the present disclosure utilizes the contact identification module to identify whether a third-party incoming call number exists in the address book of the communication device and utilizes the hands-free control module to help determine whether the current call is taken the hands-free mode, and utilizes the voice broadcast module to broadcast the information of the third-party incoming call when the current call is in handset mode, therefore, a determination of whether to answer the third-party incoming call could be made without taking the earpiece of the communication device away from the ear, and important content will not be missed as well as the important incoming call.

In order to make the abovementioned purposes, characteristics and advantages be more apparent and understandable, detailed descriptions accompanying preferred embodiments and drawings are given below.

DETAILED DESCRIPTION OF PREFERRED EMBODIMENTS

Embodiments of the present disclosure will now be described more apparently and completely with reference to the drawings of the embodiments. Obviously, the illustrated embodiments are only a part but not all of the embodiments of the present disclosure. All the other embodiments which could be obtained without creativity by one of ordinary skill in the art according to the illustrated embodiments would be claimed within the scope of the present disclosure.

Figure 1:
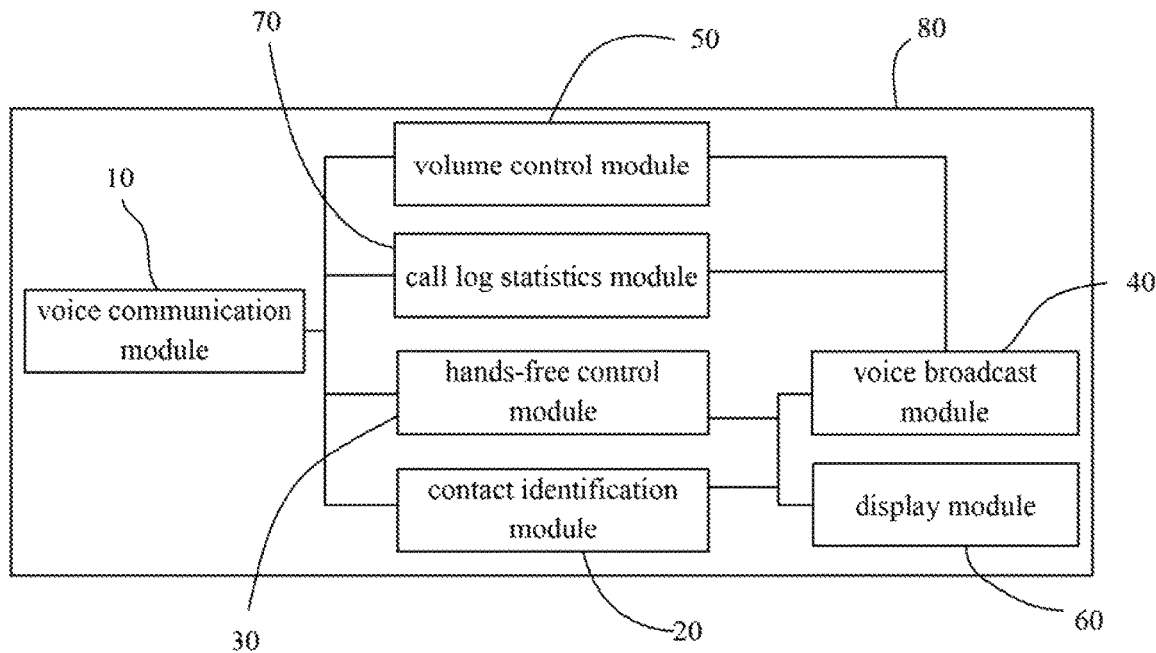
FIG. 1 shows a block diagram of a system for voice prompt of a third-party call according to an embodiment of the present disclosure.

FIG. 1 shows a block diagram of a system for voice prompt of a third-party call according to an embodiment of the present disclosure. Referring to FIG. 1, the system for voice prompt of a third-party call is applied in a communication device 80 and includes a voice communication module 10, a contact identification module 20, a hands-free control module 30, a voice broadcast module 40, a volume control module 50 and a display module 60.

The voice communication module 10 is configured for monitoring and controlling voice call of a communication device. It can originate a call according to user's operation, and establish a connection between a called and a calling user when there is an incoming call, and further can receive a third-party call request while the communication device is in a call process and transmit the dialed or incoming call number to the contact identification module 20. In the present disclosure, the communication device may be a mobile phone, a land-line telephone, or other wired or wireless communication device.

The contact identification module 20 is in signal connection with the voice communication module 10, the voice broadcast module 40 and the display module 60. The contact identification module 20 is configured for identifying whether the dialed or incoming call number exists in the address book of the communication device, and extracting an incoming call information such as a corresponding contact name when the dialed or incoming call number exists in the address book and sending the information to the display module 60, or sending the dialed or incoming call number directly to the display module 60 when the dialed or dialed number does not exist in the address book. The contact identification module 20 could also extract an incoming call information such as the name of the corresponding contact, the business name of the contact, the position of the contact or etc, from the address book when the incoming call number, especially the third-party incoming call number, exists in the address book and send the information to the voice broadcast module 40, or send the incoming call number directly to the voice broadcast module 40 when the incoming call number, especially the third-party incoming call number, does not exist in the address book. In the present disclosure, the name of the contact is not limited to a combination of the contact's last name and given name, it may also be the given name of the contact, the nickname of the contact, the English name of the contact, the code name of the contact, or other names could identify the contact.

The hands-free control module 30 is in signal connection with the voice communication module 10, the display module 60 and the voice broadcast module 40. The hands-free control module 30 could extract a status of a current call when a third-party call incomes to help the system judge whether the current call is in hands-free mode, and notifies the voice broadcast module 40 to broadcast the incoming call information based on the identification result of the contact identification module 20 when the current call is in handset mode but not in hands-free mode, or notifies the display module 60 to display the incoming call information based on the identification result of the contact identification module 20 when the current call is in hands-free mode. In the present disclosure, the handset mode includes receiving the incoming call directly by the handset of the communication device, and receiving the incoming call by the wireless headset or the wired headset through Bluetooth or Cable transmission technology.

The voice broadcast module 40 is in signal connection with the hands-free control module 30 and the contact identification module 20 for receiving information from the contact identification module 20 to voice broadcast the incoming call information according to the identification result of the contact identification module 20, especially when a third-party call incomes, to voice broadcast the incoming call information according to the identification result of the contact identification module 20. In the present disclosure, the voice broadcast refers to reciting the incoming call information in the form of real voice. The content of the incoming call information may include the name of the contact, the business name of the contact, the position of the contact, the incoming call number, a stranger call or etc. More concretely, when the incoming call number exists in the address book of the communication device, the voice broadcast module 40 broadcasts the contact corresponding to the incoming call number, and the content of the broadcasting information can be "XXX (contact name)" or "XXX is calling". When the incoming call number does not exist in the address book of the communication device, the voice broadcast module 40 broadcasts the incoming call number or broadcasts the incoming call as a stranger call, and the content can be "Stranger", "Stranger call", "Stranger is calling", "XXXX (phone number)", "XXXX (phone number) is calling" or etc. Furthermore, when the incoming call number exists in the address book of the communication device, the business name of the contact and/or the position of the contact can be added to the broadcasting content so that the user can make a judgment based on the content of the broadcast. Especially in the case a caller has not been in contact with the user for a long time, and the user has forgotten the contact or forgotten the basic information of the contact, broadcasting the business name and/or the position of the contact can increase the information obtained by the user, and help the user recall the contact and determines whether to answer the incoming call.

The volume control module 50 is in signal connection with the voice communication module 10 and the voice broadcast module 40 for deriving a volume of the current call from the voice communication module 10 and controlling a volume output of the voice broadcast module 40 to make the volume broadcasted by the voice broadcast module 40 less than the volume of the current call several levels. Preferably, the broadcast volume is less than two levels of the volume of the current call. In the present disclosure, one volume level corresponds to the volume adjusted by pressing the volume adjustment key of the communication device one time. Since the volume of the broadcast is less than the volume of the current call, the user can hear the information broadcasted by the voice broadcast module 40 without cutting off the current call, to prevent missing an important content of the current call. Moreover, since the decisions are made according to the broadcast content of the third-party calls without taking the handset of the communication device away from the ear, important content will not be missed as well as the important incoming call.

In addition, the system for voice prompt of a third-party call of the present disclosure further includes a call log statistics module 70. The call log statistics module 70 is in signal connection with the voice communication module 10 and the voice broadcast module 40, for recording the cumulative number of dialing-in (i.e., the cumulative dial-in times) and/or the cumulative number of answering of the incoming calls, and informing the voice broadcast module 40 to broadcast the cumulative number or numbers. Especially when the incoming call number does not exist in the address book of the communication device, that is, when the incoming number is an unfamiliar number, broadcasting the cumulative number of dialing-in and/or the cumulative number of answering of the incoming call can help the user make a preliminary judgment on the incoming number, so as to avoid missing a useful incoming call. In the case that the user need to contact a phone number in a certain period of time but does not need to contact the phone number in the future, the phone number may not be stored in the address book and is easy to be forgotten after a long time, broadcasting the cumulative number of dialing-in and/or the cumulative number of answering of the incoming calls can avoid the user making a misjudgment, and improve accuracy of the judgment made by the user to determine whether to answer the incoming call. In addition, in order to increase the accuracy of the user's judgment, the call log statistics module 70 could further record an auxiliary information such as the most recent dial-in time of the incoming call, the most recent answering time of the incoming call, the number of dial-out times of the incoming call and the most recent dial-out time of the incoming call, and transmits the auxiliary information to the voice broadcast module 40 to increase the information obtained by the user to help the user make an accurate determination.

It should be noted that when the communication device is in a call process, the volume broadcasted by the voice broadcast module 40 needs to be less than the volume of the current call. When there is no current call process existed in the communication device, the volume of the voice broadcast module 30 could be equal to a current volume setting of the communication device.

According to the forgoing descriptions, the system for voice prompt of a third-party call of the present disclosure utilizes the contact identification module 20 to identify whether a third-party incoming call number exists in the address book of the communication device and utilizes the hands-free control module 30 to help determine whether the current call is taken the hands-free mode, and the voice broadcast module 40 is used for broadcasting the information of the third-party incoming call when the current call is in handset mode, therefore, a determination of whether to answer the third-party incoming call could be made without taking the earpiece of the communication device away from the ear, and important content will not be missed as well as the important incoming call.

Figure 2:
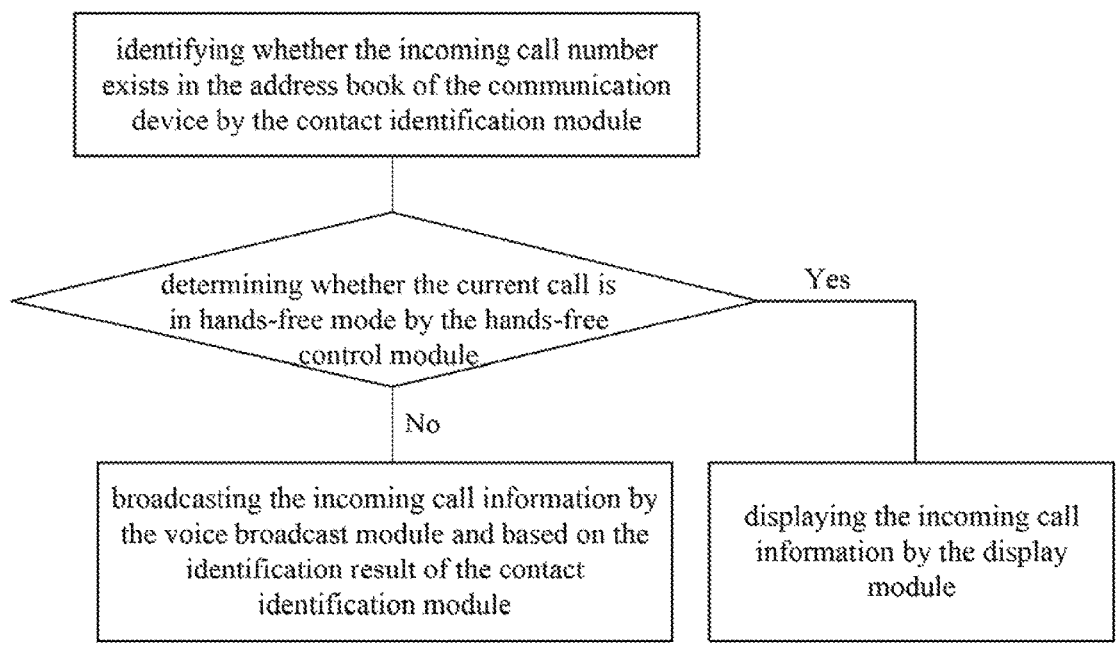
FIG. 2 shows a flow chart of a method for voice prompt of a third-party call according to an embodiment of the present disclosure.

Referring to FIG. 2, the method for voice prompt of a third-party call of the present disclosure includes the following steps.

Step 1: Identifying whether the incoming call number exists in the address book of the communication device by the contact identification module 20.

Step 2: Determining whether the current call is in hands-free mode by the hands-free control module 30.

Step 3: Displaying the incoming call information by the display module 60 when the current call is in hands-free mode. More concretely, when the incoming call number exists in the address book of the communication device, the display module 60 displays the contact name of the incoming call. When the incoming call number does not exist in the address book of the communication device, the display module 60 displays the incoming call number or displays the incoming call as a stranger call.

Step 4: Broadcasting the incoming call information by the voice broadcast module 40 and based on the identification result of the contact identification module 20 when the current call is in handset mode. More concretely, when the incoming call number exists in the address book of the communication device, the voice broadcast module 40 broadcasts the contact name of the incoming call. When the incoming call number does not exist in the address book of the communication device, the voice broadcast module 40 broadcasts the incoming call number or broadcasts the incoming call as a stranger call.

In order to prevent the broadcasting content from interfering with the current call, the volume of the voice broadcast module 40 is less than the volume of the current call. For this purpose, the method of the present disclosure further includes the following steps.

Step 5: Obtaining the volume of the current call by the volume control module 50.

Step 6: Controlling the volume output of the voice broadcast module 40 by the volume control module 50, making the volume broadcasted by the voice broadcast module 40 less than the volume of the current call several levels.

Moreover, the voice broadcast module 40 could further broadcast the business name and/or the position of the contact corresponding to the incoming call number when the incoming call number exists in the address book of the communication device. In the embodiment that the voice broadcast module 40 broadcast the business name and/or the position of the contact corresponding to the incoming call number, the method of the present disclosure further includes the following steps.

Step 7: Extracting the business name and/or the position of the contact from the address book of the communication device by the contact identification module 20.

Step 8: Broadcasting the business name and/or the position of the contact by the voice broadcast module 40.

When the incoming call number exists in the address book of the communication device, the display module 60 could further display the business name and/or the position of the contact corresponding to the incoming call number. In the embodiment that the display module 60 displays the business name and/or the position of the contact corresponding to the incoming call number, the method of the present disclosure further includes the following steps.

Step 9: Extracting the business name and/or the position of the contact from the address book of the communication device by the contact identification module 20.

Step 10: Displaying the business name and/or the position of the contact by the display module 60.

Moreover, when the incoming call number does not exist in the address book of the communication device, the display module 60 could further display the cumulative dialing number and/or the cumulative answering number of the incoming calls. In the embodiment that the display module 60 further displays the cumulative dialing number and/or the cumulative answering number of the incoming calls, the method of the present disclosure further includes the following steps.

Step 11: Recording the cumulative dialing number and/or the cumulative answering number of the incoming call by the call log statistics module 70.

Step 12: Displaying the cumulative dialing number and/or the cumulative answering number of the incoming call by the display module 60.

When the incoming call number does not exist in the address book of the communication device, the voice broadcast module 40 could further broadcast the cumulative dialing number and/or the cumulative answering number of the incoming call. In the embodiment that the voice broadcast module 40 further broadcasts the cumulative dialing number and/or the cumulative answering number of the incoming call, the present disclosure further includes the following steps.

Step 13: Recording the cumulative dialing number and/or the cumulative answering number of the incoming call by the call log statistics module 70.

Step 14: Broadcasting the cumulative dialing number and/or the cumulative answering number of the incoming call by the voice broadcast module 40.

It should be noted that the steps of the method for voice prompt of a third-party call of the present disclosure are not limited to the above arranged orders, and the permutation of the arrangement can be appropriately changed.

According to the forgoing descriptions, the method for voice prompt of a third-party call of the present disclosure utilizes the contact identification module 20 to identify whether a third-party incoming call number exists in the address book of the communication device and utilizes the hands-free control module 30 to help determine whether the current call is taken the hands-free mode, and the voice broadcast module 40 is used for broadcasting the information of the third-party incoming call when the current call is in handset mode, therefore, a determination of whether to answer the third-party incoming call could be made without taking the earpiece of the communication device away from the ear, and important content will not be missed as well as the important incoming call. In addition, the voice broadcast module 40 could further broadcast the business name and/or the position of the contact corresponding to the incoming call number when the incoming call number exists in the address book of the communication device, or could further broadcast the cumulative dialing number and/or the cumulative answering number of the incoming call number when the incoming call number does not exist in the address book of the communication device, which increases the information obtained by the user to help the user recall the contact or the information about the contact to help the user make an accurate determination.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A system for voice prompt of a third-party call, comprising:
   a contact identification module configured for identifying whether a third-party incoming call number exists in an address book of a communication device;
   a hands-free control module configured for extracting a status of a current call, when a third-party caller dials in, to judge whether the current call is in a hands-free mode or in a handset mode of the communication device, if the communication device is in the hands-free mode, a content of the current call is broadcasted by a loudspeaker of the communication device, if the communication device is in the handset mode, the content of the current call is broadcasted by a handset of the communication device;
   a voice broadcast module configured for voice broadcasting an information of the third-party incoming call according to an identification result of the contact identification module when the current call is in the handset mode; and
   a display module configured for displaying the information of the third-party incoming call according to the identification result of the contact identification module when the current call is in the hands-free mode.

2. The system for the voice prompt of the third-party call according to claim 1, wherein the voice broadcast module broadcasts a contact name corresponding to the third-party incoming call number when the third-party incoming call number exists in the address book of the communication device, or broadcasts the third-party incoming call number or broadcasts the third-party incoming call as a stranger call when the third-party incoming call number does not exist in the address book of the communication device.

3. The system for the voice prompt of the third-party call according to claim 2, wherein the voice broadcast module further broadcasts a business name of the contact and/or a business position of the contact when the third-party incoming call number exists in the address book of the communication device.

4. The system for the voice prompt of the third-party call according to claim 2, wherein the system further comprises a call log statistics module, the call log statistics module is configured for recording a cumulative number of dialing-in and/or a cumulative number of answering of the incoming call, and the voice broadcast module further broadcasts the cumulative number of dialing-in and/or the cumulative number of answering of the incoming call when the incoming call number does not exist in the address book of the communication device.

5. The system for the voice prompt of the third-party call according to claim 1, wherein the display module is configured for displaying a contact name corresponding to the incoming call number when the third-party incoming call number exists in the address book of the communication device and the current call is in hands-free mode, or displaying the third-party incoming call number or displaying the third-party incoming call as a stranger call when the third-party incoming call number does not exist in the address book of the communication device and the current call is in hands-free mode.

6. The system for the voice prompt of the third-party call according to claim 5, wherein the display module further displays a business name of the contact and/or a business position of the contact when the third-party incoming call number exists in the address book of the communication device.

7. The system for the voice prompt of the third-party call according to claim 5, wherein the system further comprises a call log statistics module, the call log statistics module is configured for recording a cumulative number of dialing-in and/or a cumulative number of answering of the incoming call, and the display module further displays the cumulative number of dialing-in and/or the cumulative number of answering of the third-party incoming call when the third-party incoming call number does not exist in the address book of the communication device.

8. The system for the voice prompt of the third-party call according to claim 1, wherein the system further comprises a volume control module, the volume control module is configured for obtaining a volume of the current call and controlling the volume output of the voice broadcast module to make the volume broadcasted by the voice broadcast module less than the volume of the current call.

9. A method for voice prompt of a third-party call comprising:
   identifying whether a third-party incoming call number exists in an address book of a communication device by a contact identification module;
   determining whether a current call is in a hands-free mode or in a handset mode of the communication device by a hands-free control module, if the communication device is in the hands-free mode, a content of the current call is broadcasted by a loudspeaker of the communication device, if the communication device is in the handset mode, the content of the current call is broadcasted by a handset of the communication device;
   broadcasting an information of the third-party incoming call by a voice broadcast module and based on an identification result of the contact identification module when the current call is in the handset mode; and
   displaying an information of the third-party incoming call by a display module and based on the identification result of the contact identification module when the current call is in the hands-free mode.

10. The method for the voice prompt of the third-party call according to claim 9, wherein in the step of broadcasting the information of the third-party incoming call by the voice broadcast module and based on the identification result of the contact identification module when the current call is in the handset mode:
    when the third-party incoming call number exists in the address book of the communication device, the voice broadcast module broadcasts a contact name of the third-party incoming call; and
    when the third-party incoming call number does not exist in the address book of the communication device, the voice broadcast module broadcasts the third-party incoming call number or broadcasts the third-party incoming call as a stranger call.

11. The method for the voice prompt of the third-party call according to claim 10, wherein when the third-party incoming call number exists in the address book of the communication device, the method further comprises the steps of:
    extracting a business name and/or a business position of the contact from the address book of the communication device by the contact identification module; and broadcasting the business name and/or the business position of the contact by the voice broadcast module.

12. The method for the voice prompt of the third-party call according to claim 9, wherein in the step of displaying the information of the third-party incoming call by the display module when the current call is in the hands-free mode:
   when the third-party incoming call number exists in the address book of the communication device, the display module displays a contact name of the third-party incoming call; and
   when the third-party incoming call number does not exist in the address book of the communication device, the display module displays the third-party incoming call number or displays the third-party incoming call as a stranger call.

13. The method for the voice prompt of the third-party call according to claim 12, wherein when the third-party incoming call number exists in the address book of the communication device, the method further comprises the steps of:
   extracting a business name and/or a business position of the contact from the address book of the communication device by the contact identification module; and
   displaying the business name and/or the business position of the contact by the display module.

14. The method for the voice prompt of the third-party call according to claim 9, wherein the method further comprises the steps of:
   recording a cumulative number of dialing-in and/or a cumulative number of answering of the third-party incoming call by a call log statistics module; and
   broadcasting or displaying the cumulative number of dialing-in and/or the cumulative number of answering of the third-party incoming call by the voice broadcast module or by the display module when the third-party incoming call number does not exist in the address book of the communication device.

15. The method for the voice prompt of the third-party call according to claim 9, wherein the method further comprises the steps of:
   obtaining a volume of the current call by a volume control module; and
   controlling the volume output of the voice broadcast module by the volume control module, making the volume broadcasted by the voice broadcast module less than the volume of the current call.

\* \* \* \* \*